No. 734,589. PATENTED JULY 28, 1903.
R. C. MINER & H. L. FITCH.
VEHICLE LOADING DEVICE.
APPLICATION FILED DEC. 12, 1902.
NO MODEL. 4 SHEETS—SHEET 1.
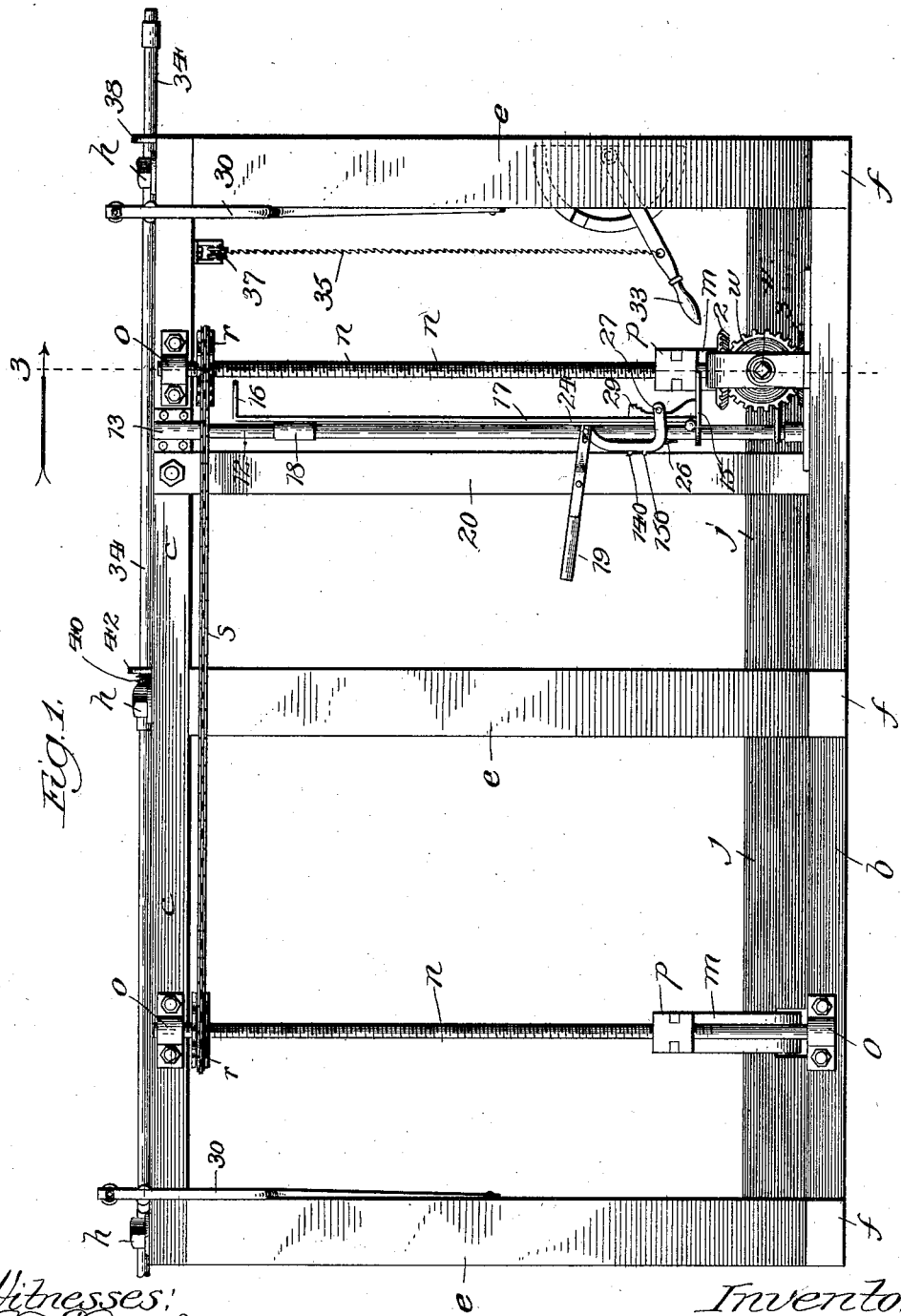
Witnesses:
Inventors:
Raymond C. Miner,
Horace L. Fitch,
By Thomas F. Sheridan,
Atty.

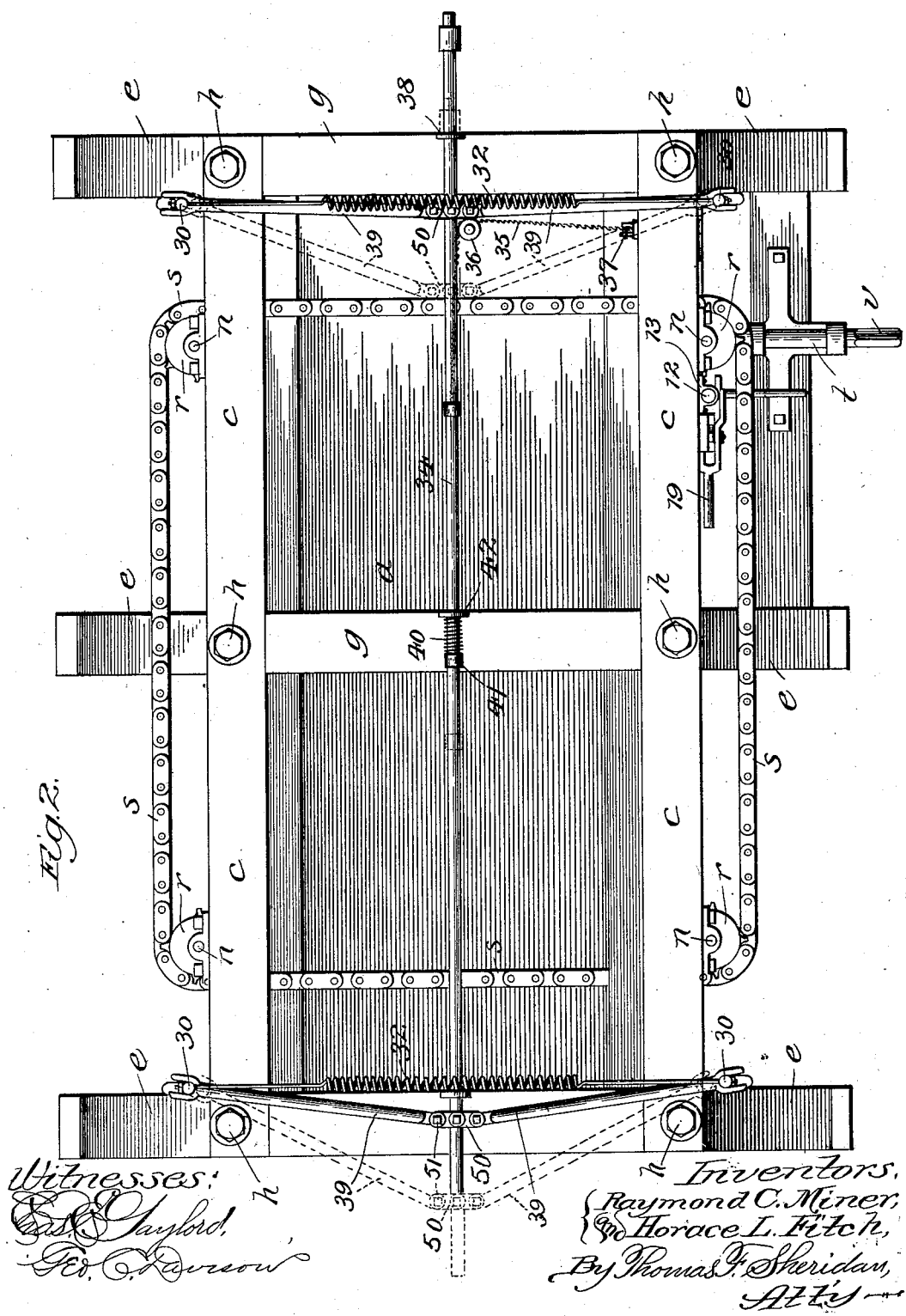

No. 734,589. PATENTED JULY 28, 1903.
R. C. MINER & H. L. FITCH.
VEHICLE LOADING DEVICE.
APPLICATION FILED DEC. 12, 1902.
NO MODEL. 4 SHEETS—SHEET 3.
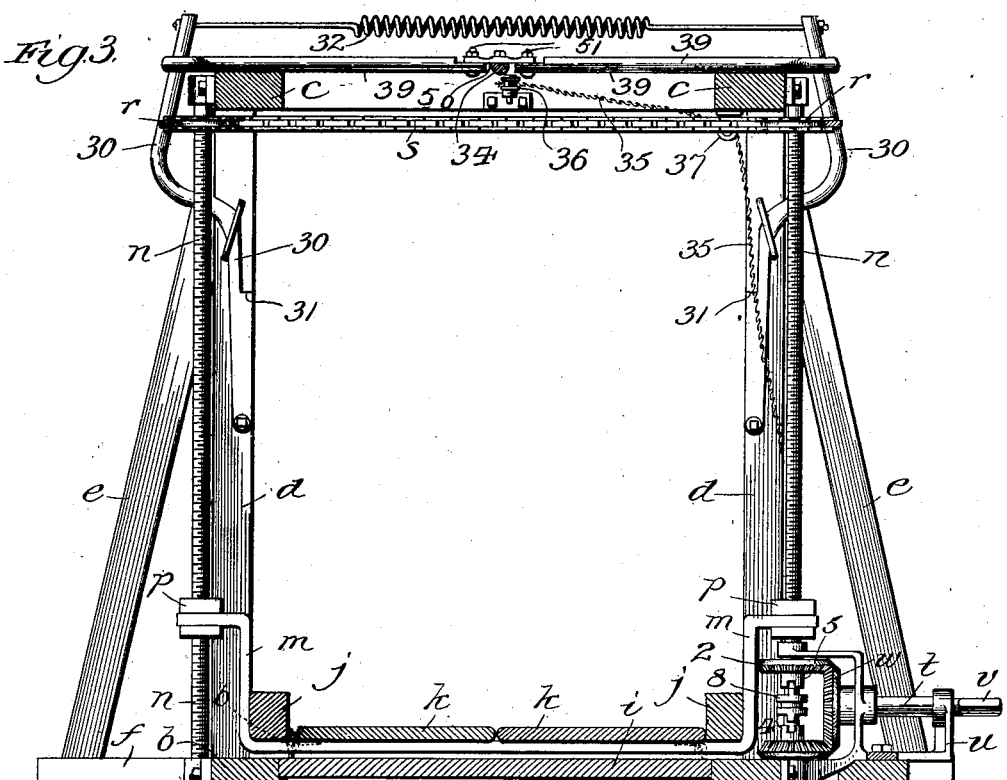
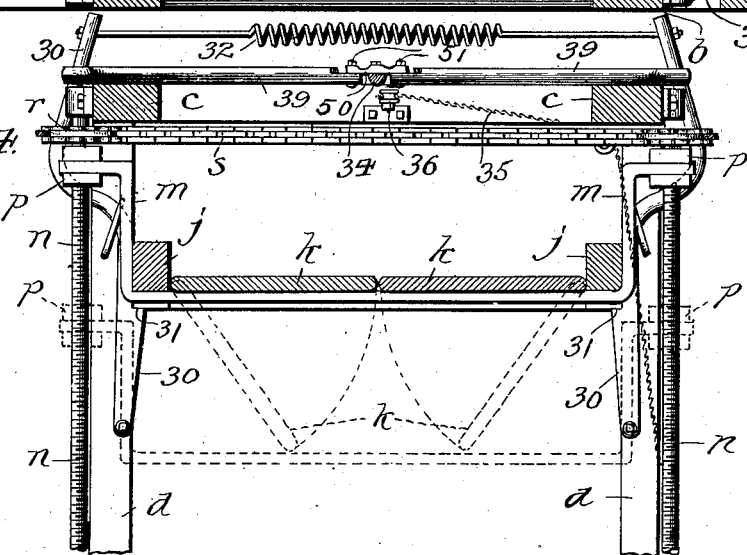
Witnesses:
Inventors.
Raymond C. Miner,
Horace L. Fitch,
By Thomas F. Sheridan,
Att'ys No. 734,589. PATENTED JULY 28, 1903.
R. C. MINER & H. L. FITCH.
VEHICLE LOADING DEVICE.
APPLICATION FILED DEC. 12, 1902.
NO MODEL. 4 SHEETS—SHEET 4.
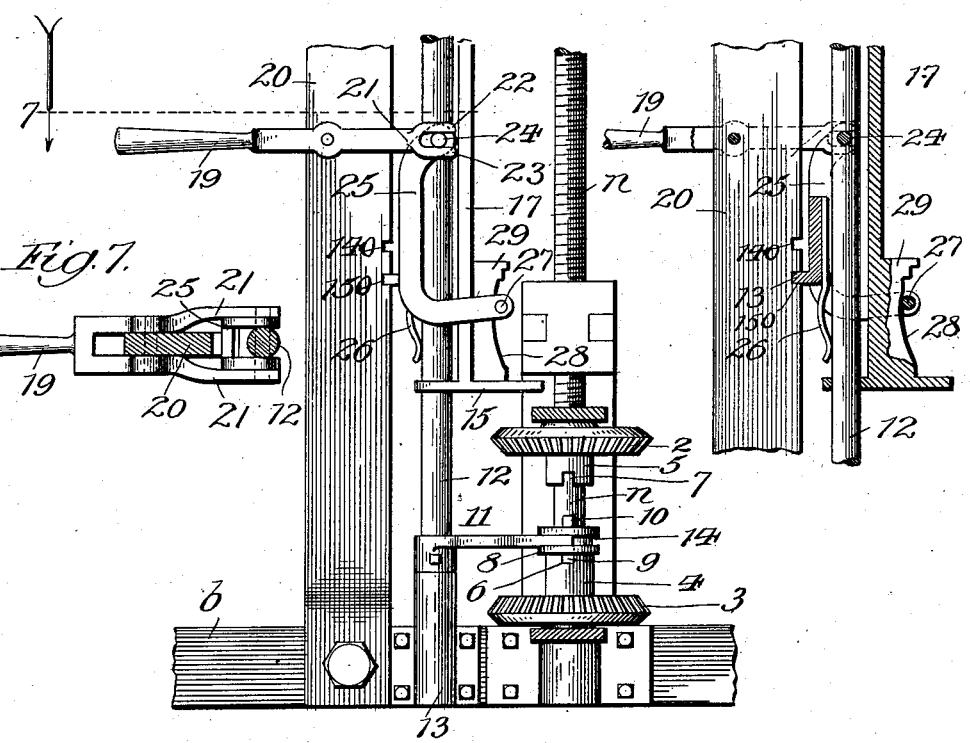
Witnesses:
Inventors:
Raymond C. Miner,
Horace L. Fitch,
By Thomas F. Sheridan,
Atty.

No. 734,589. Patented July 28, 1903.

UNITED STATES PATENT OFFICE.

RAYMOND C. MINER AND HORACE L. FITCH, OF HUDSON, SOUTH DAKOTA.

VEHICLE-LOADING DEVICE.

SPECIFICATION forming part of Letters Patent No. 734,589, dated July 28, 1903.

Application filed December 12, 1902. Serial No. 134,965. (No model.)

*To all whom it may concern:*

Be it known that we, RAYMOND C. MINER and HORACE L. FITCH, citizens of the United States, residing at Hudson, South Dakota, have invented certain new and useful Improvements in Vehicle-Loading Devices, of which the following is a specification.

Our invention relates to that class of vehicle-loading devices having a movable dumping-platform mounted in a suitable frame and adapted to be raised with the load thereon above the vehicle to be loaded and which are provided with means for raising and lowering the platform and dumping the load from such platform when in its raised position.

The principal object of the invention is to provide a simple, economical, and efficient vehicle-loading device.

A further object of the invention is to provide a vehicle-loading device having an upwardly and downwardly movable dumping-platform, with means for raising such platform above the vehicle to be loaded and with means for dumping the load therefrom when in its raised position, whereby the material to be handled may be placed upon the dumping-platform while in its lowered position by means of horses and scrapers or in any similar or desired manner and raised into its upper position, so as to permit the vehicle to be loaded to be driven thereunder and the material on the dumping-platform to be dumped quickly and efficiently, leaving the vehicle to be employed elsewhere while the platform is in the process of being loaded.

Other and further objects of the invention will appear from an examination of the drawings and the following description and claims.

The invention consists in the features, combinations, and details of construction hereinafter described and claimed.

In the accompanying drawings, Figure 1 is a side elevation of a loading device constructed in accordance with my improvements; Fig. 2, a plan view thereof; Fig. 3, a sectional end view taken on line 3 of Fig. 1 looking in the direction of the arrow and showing the dumping-platform in its lowered position; Fig. 4, a sectional end view of the upper portion of the device, showing the dumping-platform in its raised position and the open position of the dumping-doors in dotted lines; Fig. 5, a broken sectional elevation showing one of the platform-operating rods with its gear and clutch mechanism and the means for automatically throwing the gears into and out of operative engagement with such rod; Fig. 6, a broken detail view in elevation of the locking-dog mechanism for holding the clutch in engagement with the upper and lower gears alternately; Fig. 7, a detail view of the clutch-operating lever, and Fig. 8 a detail of one of the platform-supporting nuts.

In constructing a device in accordance with our improvements we provide a frame *a* of the desired size and strength to hold the operative mechanism in position, sustain the dumping-platform with its load, and permit the material handled to be placed upon the platform by means of scrapers drawn by horses. The frame must also be of sufficient dimensions to permit a vehicle to be driven beneath the dumping-platform when such platform is in its raised position. The frame therefore comprises lower longitudinal sills *b*, upper longitudinal sills *c*, uprights *d*, and side braces *e*, forming the side frames, which are connected and held firmly in position by means of lower transverse sills *f* and upper transverse sills *g*, in turn connected with the side frames by means of bolts *h* or in any ordinary and well-known manner. A fixed platform *i* may be arranged between the side frames, upon which the vehicle to be loaded may be driven. Above this fixed platform and between the side frames is arranged what we prefer to term a "movable dumping-platform," comprising an outer rigid frame portion *j*, having dumping-doors *k*, which may be said to at least partly form the platform and are swingingly connected to the frame thereof by means of hinges *l*, so as to meet in the center of the platform and swing downward when desired to dump the load.

In order to provide means for raising and lowering the dumping-platform, holding it in raised position while being dumped and performing the dumping operation, and at the same time to provide the platform with the necessary rigidity and strength, platform-supporting straps *m* are arranged underneath the platform near each end and upon which it rests. Threaded rods *n* are rotatably and perpendicularly mounted in the frame in bearing-plates o, and supporting-nuts p are mounted in threaded engagement with such rods, and the ends of the platform-supporting straps are mounted in such supporting-nuts in horizontal grooves q. Each of the threaded rods is provided at its upper end with a sprocket-wheel r, which rotates therewith, and all are connected by means of a sprocket-chain s, mounted upon the sprocket-wheels, as shown in Fig. 2. It will thus be seen that by rotating either of the threaded rods all will be caused to rotate simultaneously and at the same rate of speed, and the dumping-platform will be thereby raised and lowered in an efficient manner by means of the threaded engagement of the platform-supporting mechanism with such rods. In order to provide means for rotating the rods, and thereby raising and lowering the dumping-platform and its supports either together or independently, as may be desired, a main driving-shaft t is provided and mounted in a horizontal position in suitable brackets u, one end of such shaft being provided with a squared end v or similar means whereby it is adapted to be connected to a tumbling-rod or suitable source of power. Upon the other end of the driving-shaft is mounted a main driving bevel-gear w. Upon one of the perpendicular threaded shafts is loosely mounted an upper bevel-gear 2 and a similar lower bevel-gear 3, each provided with shoulders 4 and 5, forming recesses 6 and 7, and a clutch 8 is mounted upon a squared portion of such rod between the upper and lower bevel-gears, so as to rotate with the rod and slide up and down thereon into and out of engagement with either, as desired. This clutch is provided with a lower shoulder 9, adapted to enter the slot of the lower bevel-gear when the clutch is in its lowered position, and a shoulder 10, adapted to enter the slot of the upper gear when the clutch is in its raised position, thus throwing each of such gears into and out of operative connection with the threaded rod alternately when desired. By this arrangement the bevel-gears of the upright rod are constantly in engagement with the gear of the main driving-shaft and enable the threaded rods to be driven in either direction when desired without changing the direction of rotation of the main driving-shaft or its gear-wheel.

In order to enable the clutch mechanism to be operated both automatically and otherwise, an arm 11 is mounted upon a perpendicular rod 12, which is slidably mounted adjacent to and parallel with the threaded rod by means of bearing-plates 13. The outer end of this arm is split, so as to extend upon each side of the clutch and into the peripheral slot 14 therein, and the arm-supporting rod is provided with a second arm 15, slidingly mounted thereon, which extends into the path of one of the platform-supporting nuts and when pressed downward thereby causes the clutch to descend out of engagement with the upper gear. From this position the clutch may be moved into engagement with either gear. A third arm 16 is also slidingly mounted upon the rod 12, with its outer end also extending into the path of the platform-supporting nut and above such nut when in its raised position, so as to be pressed upward thereby and throw the clutch out of engagement with the lower gear-wheel. It may then be readily thrown into engagement with the upper gear-wheel, changing the direction of rotation of the threaded rods and causing the dumping-platform to move downward.

We prefer to connect arms 15 and 16, or rather to make them of one piece with the rod 17 and mount them together slidably upon the rod 12 by means of a thimble 18 and a perforation in the lower sliding arm, through which the rod 12 extends. By this arrangement it will be readily understood that (the clutch being in engagement with the lower gear-wheel) when the platform-supporting nut contacts the upper arm 16 the clutch will be automatically thrown out of engagement with such gear and that it may then be thrown into engagement with the upper gear, which is turning in the opposite direction, and the direction of rotation of the threaded rods thereby reversed. When the platform reaches its lower position and comes in contact with the arm 15, the clutch is thrown out of engagement with the upper gear, thereby stopping the rotation of all the threaded rods and the downward movement of the platform and leaving the clutch in position to be readily thrown into engagement with the lower gear and the direction of rotation of the threaded rods thus again changed, so as to raise the platform.

In order to hold the clutch in engagement with the upper and lower gear-wheels, respectively, and provide means for throwing it into engagement with such wheels, an operating-lever arm 19 is pivotally mounted upon a standard 20 on the main frame of the device, with its swinging end split perpendicularly, so as to provide side arms 21, which extend on opposite sides of the clutch-operating rod and which are in turn split horizontally, so as to provide upper arms 22 and lower arms 23, which are mounted in sliding engagement with a horizontal pivot 24 on the clutch-operating rod. A dog or lever 25 is pivotally mounted upon the clutch-operating rod 12 and provided with a lug 13, adapted to alternately enter slots 140 and 150 of the standard 20 in response to the action of a spring 26 upon the dog. The dog or lever 25 is provided at its swinging end with a pin 27, which slidingly engages the inclined surface 28 of a sliding block 29, which block is arranged in fixed relation to the arms 15 and 16. By this arrangement when either of such arms is raised the lower inclined surface of the sliding block presses the lugs of the locking-dog out from the groove with which it is engaged, so as to permit the clutch to be raised or lowered into contact with the desired gear-wheel, and when the dog is lowered its upper inclined surface performs the same function in a similar manner. In other words, the dog 25 is pressed out of locking engagement when the sliding block is pressed either upward or downward, and the clutch is thus out of engagement with both gears and permitted to be thrown into engagement with either the upper or lower one by means of the operating-lever 19 and also held in engagement with such gear-wheel by means of the dog above described.

When it is desired to raise the dumping-platform with its load, the threaded rods being provided with right-hand threads, the clutch is thrown into engagement with the lower gear-wheel and the rotation of the rods causes the platform to rise to its uppermost position. In order to hold it in this position while being dumped, side arms 30 are pivotally mounted in the uprights of the frame and provided with shoulders 31, adapted to extend beneath the edges of the movable platform in response to the action of springs 32, by means of which the upper swinging ends of such arms are flexibly connected. The direction of rotation of the threaded rods being reversed, the supporting-straps with their supporting-nuts are lowered on the rods a sufficient distance to permit the dumping-doors to be swung apart and dump the load. The straps are then raised into engagement with the platform and dumping-doors, closing such doors, and the swinging arms are thrown out of engagement with such platform by pressing the operating-lever arm 33 downward. This lever-arm is connected to a horizontal operating-rod 34 by means of a cable or similar flexible element 35, mounted in pulleys 36 and 37. The operating-rod is slidingly mounted in the frame of the device in bearing-plates 38 and is connected to the platform-supporting arms by means of swinging arms 39, which loosely engage the swinging ends of the platform-supporting arms and are pivotally connected with the operating-rod by means of shoulders 50, provided with pivots 51. The swinging arms 39 are arranged in such position with relation to the platform-supporting arms that when the operating-lever is thrown in one direction—to the left, as shown in dotted lines in Fig. 2—the platform-supporting arms will be permitted to engage the platform and hold it in its raised position, and when the operating-lever is thrown in the opposite direction—to the right—into the position shown in full lines in Fig. 2 the platform-supporting arms will be thrown out of engagement with the platform, and it will be in position to be lowered by the mechanism above described. For throwing the operating-rod to the left a spiral spring 40 is mounted thereon in engagement with a shoulder 41 on the rod and with bearing-plate 42 on the frame.

In operation the main driving-shaft may be permitted to rotate continuously when desired, and by throwing the upper or lower gear-wheel of the threaded rod into operative engagement with such rod by means of the clutch mechanism above described all of the rods may be caused to rotate in either direction when desired and the dumping-platform raised or lowered without changing the direction of rotation of the main driving-shaft. The dumping-platform may be loaded with manure, dirt, or other material while in its lowered position by hauling the material thereon with scrapers drawn by horses or in any desired manner, and the platform, with its load, may then be raised into position to permit the vehicle to be driven thereunder. The platform may then be emptied by opening the dumping-doors and afterward returned to its lowered position to be again filled while the vehicle is being driven away and unloaded, thus enabling it to be employed elsewhere while the platform is being loaded and saving valuable time.

We claim—

1. In a device of the class described, the combination of a frame, dumping-platform mechanism movably mounted in such frame comprising a pair of dumping-doors, means for holding such dumping-doors in closed position and permitting them to be opened, a plurality of threaded rods provided with sprocket-wheel and chain mechanism, gear mechanism in engagement with at least one of such rods, and means for throwing the gear mechanism into and out of operative position, substantially as described.

2. In a device of the class described, the combination of a frame, a plurality of threaded rods rotatably mounted in such frame, each provided with a sprocket-wheel, a chain mounted upon and connecting such sprocket-wheels, a dumping-platform, platform-supporting mechanism provided with screw-threads in threaded engagement with such threaded rods, gear-wheel mechanism mounted upon at least one of such rods, means for throwing such gear-wheel mechanism into and out of operative engagement with such rods, and a driving-shaft provided with a gear-wheel in toothed engagement with such gear-wheel mechanism, substantially as described.

3. In a device of the class described, the combination of a frame, a plurality of threaded rods rotatably mounted in such frame, each provided with a sprocket-wheel, a chain mounted upon and connecting such sprocket-wheels, a dumping-platform, platform-supporting mechanism provided with threaded supporting nut mechanism in threaded engagement with the threaded rods, a pair of gear-wheels loosely mounted upon one of such threaded rods, clutch mechanism slidingly mounted upon such rod and rotatable therewith between such gear-wheels, means for moving such clutch mechanism into and out of engagement with such gear-wheels, respectively, and a driving-shaft provided with a gear-wheel in toothed engagement with the gear-wheels upon the threaded rod, substantially as described.

4. In a device of the class described, the combination of a frame, a movable dumping-platform mounted therein comprising dumping-door mechanism, platform-supporting mechanism provided with screw-threads, a plurality of rotatably-mounted perpendicular threaded rods arranged in threaded engagement with the platform-supporting mechanism, and means for rotating such rods simultaneously, substantially as described.

5. In a device of the class described, the combination of a frame, dumping-platform mechanism mounted therein, platform-supporting mechanism engaging such platform and provided with threaded-nut mechanism, a plurality of threaded rods arranged in threaded engagement with such nut mechanism, a pair of gear-wheels mounted upon one of such threaded rods, means for automatically throwing such gear-wheels, respectively, into or out of engagement with such threaded rod, and a driving-shaft provided with a gear-wheel in toothed engagement with such gear-wheels, substantially as described.

6. In a device of the class described, the combination of a frame, an upwardly and downwardly movable dumping-platform mounted therein, platform-supporting mechanism provided with screw-threads, a plurality of threaded rods in threaded engagement with such platform-supporting mechanism, means for rotating such threaded rods, and means for automatically stopping the rotation thereof and thereby the movement of the dumping-platform in either direction, substantially as described.

7. In a device of the class described, the combination of a frame, a dumping-platform movably mounted therein, platform-supporting mechanism provided with screw-threads, a plurality of threaded rods in threaded engagement with such platform-supporting mechanism, sprocket-wheel and chain mechanism mounted upon and connecting such threaded rods, gear-wheel mechanism mounted upon at least one of the rods, a driving-shaft provided with a gear-wheel in engagement with such gear-wheel mechanism, and means for changing the direction of rotation of the threaded rods without changing that of the driving-shaft or gear-wheels, substantially as described.

8. In a device of the class described, the combination of a frame, an upwardly and downwardly movable dumping-platform mounted therein, platform-supporting mechanism mounted movably with and independently of the dumping-platform and provided with screw-threads, a plurality of threaded rods in threaded engagement with such platform-supporting mechanism, means for rotating such threaded rods, and means for automatically stopping the rotation thereof and thereby the movement of the dumping-platform and platform-supporting mechanism in either direction, substantially as described.

9. In a device of the class described, the combination of a frame, a plurality of threaded rods rotatably mounted in such frame, each provided with a sprocket-wheel, a chain mounted upon and connecting such sprocket-wheels, a dumping-platform provided with a pair of dumping-doors, platform-supporting mechanism comprising a plurality of metallic straps movable independently of and with the platform extending beneath the dumping-doors and provided with threaded supporting-nut mechanism in threaded engagement with the threaded rods, separate platform-supporting mechanism arranged independently of the threaded rods for holding the dumping-platform in its raised position, a pair of gear-wheels loosely mounted upon one of such threaded rods, clutch mechanism slidingly mounted upon such rod and rotatable therewith between such gear-wheels, means for moving such clutch mechanism into and out of engagement with such gear-wheels, respectively, and a driving-shaft provided with a gear-wheel in toothed engagement with the gear-wheels upon the threaded rod, substantially as described.

RAYMOND C. MINER.
HORACE L. FITCH.

Witnesses:
W. E. JONES,
HERBERT R. FOWLES.